March 13, 1945.                B. B. MANASTER                2,371,338
                                 COLLAR STAY
                             Filed Feb. 26, 1944

INVENTOR.
Ben B. Manaster
BY
His Attorney

Patented Mar. 13, 1945

2,371,338

UNITED STATES PATENT OFFICE 2,371,338

COLLAR STAY

Ben B. Manaster, Chicago, Ill., assignor of one-half to Charles I. Greener, Chicago, Ill.

Application February 26, 1944, Serial No. 523,977

3 Claims. (Cl. 2—132)

This invention relates to a collar stay especially designed and constructed for use in connection with shirt collars to hold and retain the wings of such collar in taut extended position and from curling back upon themselves.

It has for its principal object the provision of a novel structure of this character which will be highly efficient in use and economical in manufacture.

The present invention constitutes an improvement over that shown in United States Letters Patent No. 1,908,525 granted to me on May 9, 1933, for improvements in Collar stays.

More particularly the present invention has among its salient objects to provide a collar stay which is adaptable for use on collar wings of various lengths, one which includes a simple and inexpensive structure such as possesses what is known as "eye-appeal," and which will greatly facilitate the assembly of the various parts constituting the collar stay.

When it is appreciated that the several elements making up the collar stay are relatively small in proportion and in diameter, which often makes it difficult for the assembler to handle, it will be understood that a collar stay of this type should be of such structure as will afford ready and expeditious assembly. To this end it is the object of my invention to provide a collar stay possessing these characteristics and one which comprises relatively few parts, which, when assembled as a complete unit, has a very substantial eye-appeal to the observer.

Other objects will appear hereinafter.

The invention consists in the novel combination and arrangement of parts to be hereinafter described and claimed.

The invention will be best understood by reference to the accompanying drawing showing the preferred form of construction, and in which.

Figure 1:
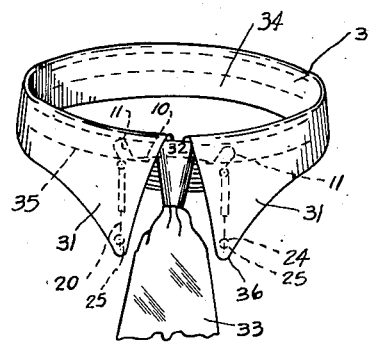
Fig. 1 is a perspective view of a collar and necktie showing my collar stay in applied position.

The drawing just previously referred to illustrates the preferred form of construction by which the several objects of the invention may be accomplished. In this connection, my improved collar stay comprises a crossbar 10, the ends of which are formed substantially U-shaped as at 11 to provide loops which bear upon the collar or the necktie band, as the case may be, when the collar stay is in applied position upon the collar.

Figure 3:
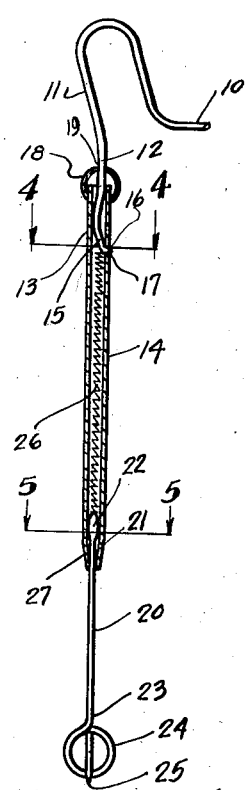
Fig. 3 is an enlarged fragmentary sectional detail view of the same.

The end portions 12 of these loops 11 project into corresponding end portions 13 of tubular members 14. In the form shown in Fig. 3, the end portions 12 of the loop members 11 are connected to the corresponding end portions 13 of the tubular members 14 by buckling these end portions 12 as at 15 to create a spring effect, whereby when the end portions 12 are forced into the end portions 13 of the tubular members 14, the extremities 16 of these end portions 12 will snap or latch into openings 17 formed in the tubular member 14.

The end portions 13 of the tubular members 14 are each capped by ball elements 18 having openings 19 formed therein through which the end portions 12 of the loops 11 project.

Figures 4, 5, 6:
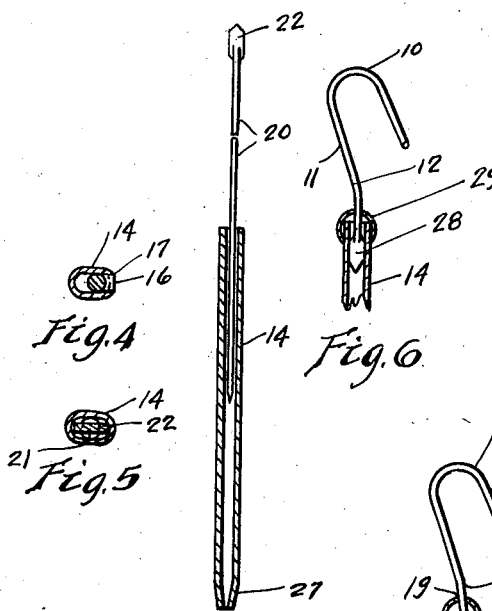
Fig. 4 is a sectional detail view taken substantially on line 4—4 of Fig. 3.
Fig. 5 is a sectional detail view taken substantially on line 5—5 of Fig. 3.
Fig. 6 is a fragmentary sectional detail view similar to that shown in Fig. 3 but illustrating a slightly modified form of construction.

These tubular members 14 are preferably substantially oval-shaped in cross-section, as shown in Figs. 4 and 5. The tubular members 14 may be made from a tube substantially round in cross section and then flattened into the oval-shape as shown in Figs. 4 and 5, or, if desired, the tubular members 14 may be formed from an elongated strip of material rolled to provide the tubular members substantially oval-shaped in cross section.

Telescopically arranged in the tubular members 14 are the leg sections 20. In the present instance, the corresponding interior end portions 21 of these leg sections are substantially flattened as at 22, and these flattened portions 22 cooperate with the tubular members to prevent rotation of the leg sections 20 relative to the tubular members.

The exterior end portions 23 of the leg sections 20 are each formed to provide a loop 24 terminating into a penetrating point 25, the loop 24 functioning to limit penetration of the penetrating point 30 into the wings of the collar.

Confined within each of the tubular members 14 is a spring 26 which engages the flattened end portion 22 of the leg sections 20 to urge the collar-penetrating points 25 in extended position with respect to the tubular members 14. To complete the invention, the tubular members 14 each have their lower end portions 27 formed substantially round in cross section, and this round portion 27 cooperates with the flattened portion 22 to limit the extent of movement of the penetrating points 25 relative to the tubular members under action of the spring 26.

In this form of construction I have described the ends 12 of the loops 11 as being connected to the tubular members 14 through the buckled end portions 15 and the openings 17. It may be desirable to simply connect the tubular members 14 to the end portions 12 of the loops 11 by compressing the ball elements 18 upon the tubular members 14 in a manner such that they will rigidly hold and connect the end portions 12 of such loops with the tubular members, thus in some respects simplifying this feature of construction.

In Fig. 6 I have illustrated a slightly modified form of construction for connecting the tubular members 14 to the end portion of the loops 11. In this form of construction, the end 12 terminates into a flattened section 28 wedgingly fit into the end portions 13 of the tube. In this form of construction, for ornamental purposes there may likewise be provided a ball element 29.

Figure 8:
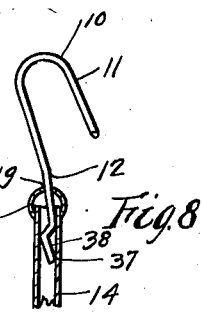
Fig. 8 is a fragmentary sectional detail view similar to Fig. 6, showing a modified form of construction.

In Fig. 8, I have shown a modified form of construction for attaching the crossbar 10 to the tube 14. In this form of construction the end 12 of the loop 11 is crimped as at 37. In assembling the parts, this crimped portion 37 is forced into the end of the tubular portion 14 and due to the resilient character of the material from which the crossbar 10 is formed, the crimped end portion 37 thus compressed in the tubular portion will effectively resist any separation between the crossbar 10 and the tubular portion 14.

In Fig. 1, I have illustrated a perspective view of a collar and necktie. In this view, my improved collar stay is shown associated with the collar. This collar 30 is of a conventional construction and includes the usual wings 31. As shown, the collar stay is mounted with the crossbar 10 disposed beneath the knot 32 of the necktie 33. The loops 11 may bear either upon the inner layer 34 of the collar or upon the adjacent portions of the tie-band 35. In such position of my improved collar stay, the collar penetrating points 25 engage the tips 36 of the wings 31 and such collar-penetrating points are limited in their penetration by the loops 24. The springs 26 act upon the leg sections 20 of the collar stay to urge the penetrating points in extended position with respect to the tubular portions 14 to maintain the penetrating points 25 in penetrating position with respect to the tips 36 of the collar wings 31.

From an observation of Fig. 1, it will be noted that my improved collar stay, like that shown in Patent No. 1,908,525, is completely concealed from the view of the observer when in applied position.

Figure 2:
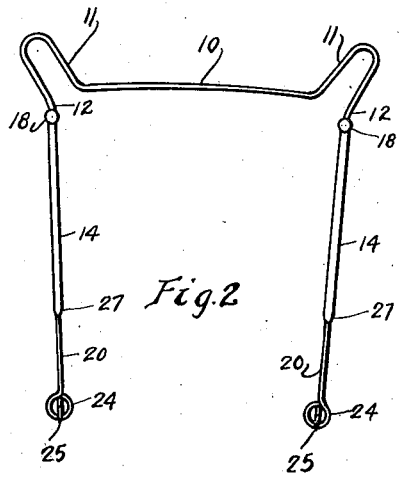
Fig. 2 is a plan view of the collar stay embodying my present invention.

As seen in Fig. 2, the symmetry of the parts is such as gives a substantial eye-appeal to the collar stay, a factor which is most desirable when the collar stay is displayed to the observer.

Figure 7:
Fig. 7 is a detail view of a leg section and tubular member embodied in my invention showing the manner of assembling the same together.

Fig. 7 illustrates the manner in which the leg section is projected through the tubular member 14 prior to the formation of the loop 24 and collar-penetrating point 25 of each of the leg sections 20. In this connection it will be seen that the leg section 20, prior to the formation of the loop and the collar-penetrating point, is simply projected through the tubular member 14, disposing during this operation the flattened portion 22 in its proper position in the tubular member 14. After this operation has taken place, it will be readily seen that it is a simple matter to form the loop and collar-penetrating point 24 and 25, respectively, and to attach the crossbar 10 to the tubular members 14 in the manner hereinbefore described.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A collar stay comprising a crossbar, tubular members extending substantially at right angles with respect to the crossbar and each substantially oval-shaped in cross section throughout the greater part of its length, means for connecting corresponding end portions of said tubular members to the end portions of said crossbar, leg sections telescopically arranged in said tubular members and having corresponding exterior portions providing collar-penetrating points, the opposite corresponding end portions of said leg sections being flattened and said flattened portions being movable in said oval-shaped portions of said tubular members, means confined in said tubular members in engagement with said leg sections to urge said collar-penetrating points in extended position with respect to said tubular members, and means for limiting the extent of movement of said collar-penetrating points relative to said tubular members.

2. A collar stay comprising a crossbar, tubular members extending substantially at right angles with respect to the crossbar and each substantially oval-shaped in cross section throughout the greater part of its length, means for connecting corresponding end portions of said tubular members to the end portions of said crossbar, leg sections correspondingly arranged in said tubular members and having corresponding exterior portions providing collar-penetrating points, opposite end portions of said leg sections being flattened and said flattened end portion being movable in the oval-shaped portion of said tubular members, means confined in said tubular members in engagement with said leg sections to urge said collar-penetrating points in extended position with respect to said tubular members, said tubular members having end portions adapted to engage said flattened end portion of said leg sections to limit the extent of movement of said collar-penetrating points relative to said tubular members.

3. A collar stay comprising a crossbar, tubular members extending substantially at right angles with respect to the crossbar and each substantially oval-shaped in cross section throughout the greater part of its length, means for connecting corresponding end portions of said tubular members to the end portions of said crossbar comprising the end portions of said crossbar adapted to have latched engagement in an opening formed in each of the tubular members and a sphere-shaped member embracing the ends of the crossbar and capped upon adjacent corresponding ends of the tubular members, leg sections correspondingly arranged in said tubular members and having corresponding exterior portions providing collar-penetrating points, opposite end portions of said leg sections being flattened and said flattened end portion being movable in the oval-shaped portion of said tubular members, means confined in said tubular members in engagement with said leg sections to urge said collar-penetrating points in extended position with respect to said tubular members, said tubular members having end portions adapted to engage said flattened end portion of said leg sections to limit the extent of movement of said collar-penetrating points relative to said tubular members.

BEN B. MANASTER.